United States Patent
Shiao et al.

(10) Patent No.: US 11,788,290 B2
(45) Date of Patent: Oct. 17, 2023

(54) ROOFING MATERIALS WITH INCREASED WIND UPLIFT RESISTANCE AND METHODS OF MAKING THEREOF

(71) Applicant: BMIC LLC, Dallas, TX (US)

(72) Inventors: Ming-Liang Shiao, Basking Ridge, NJ (US); Joey Ferraro, Savannah, GA (US); Luis Duque, Hackensack, NJ (US); Brian Lee, Linden, NJ (US); Tim Lock, Palm Harbor, FL (US); Daniel E. Boss, Morris Township, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 16/799,023

(22) Filed: Feb. 24, 2020

(65) Prior Publication Data
US 2021/0262232 A1 Aug. 26, 2021

(51) Int. Cl.
*E04D 1/26* (2006.01)
*E04D 1/00* (2006.01)

(52) U.S. Cl.
CPC .......... *E04D 1/26* (2013.01); *E04D 2001/005* (2013.01)

(58) Field of Classification Search
CPC .............................. E04D 1/26; E04D 2001/005
See application file for complete search history.

(56) References Cited

U.S. PATENT DOCUMENTS

| | | | |
|---|---|---|---|
| 3,079,729 A | 3/1963 | Newton et al. | |
| 5,719,215 A * | 2/1998 | Liang | C08J 11/20 524/62 |
| 7,836,654 B2 | 11/2010 | Belt et al. | |
| 8,006,457 B2 | 8/2011 | Binkley et al. | |
| 8,156,704 B2 | 4/2012 | Belt et al. | |
| 8,181,413 B2 | 5/2012 | Belt et al. | |
| 8,240,102 B2 | 8/2012 | Belt et al. | |
| 8,607,521 B2 | 12/2013 | Belt et al. | |
| 8,623,164 B2 | 1/2014 | Belt et al. | |
| 8,752,351 B2 | 6/2014 | Belt et al. | |
| 10,189,656 B2 | 1/2019 | Belt et al. | |
| 2003/0113566 A1 * | 6/2003 | Clemens | B05D 7/148 428/497 |
| 2004/0258883 A1 | 12/2004 | Weaver | |

(Continued)

FOREIGN PATENT DOCUMENTS

WO WO-2005100479 A1 * 10/2005 ............ C08F 297/04

OTHER PUBLICATIONS

GAF Timberline; Lifetime High Definition Shingles brochure; 2011, 13 pgs.

*Primary Examiner* — Nathan L Van Sell
(74) *Attorney, Agent, or Firm* — GREENBERG TRAURIG, LLP (57) ABSTRACT

This invention, in embodiments, relates to a roofing material having (a) a front surface, (b) a back surface, and (c) a sealant attachment zone disposed on at least the front surface of the roofing material, the sealant attachment zone including surfacing media that comprise at least one of mineral particles, polymeric particles, and combinations thereof. The sealant attachment zone has an average surface coverage of the surfacing media of 30% to 70%. The roofing material exhibits an increased wind uplift resistance, as measured according to ASTM D6381, as compared to a roofing material without a sealant attachment zone having an average surface coverage of surfacing media of 30% to 70%.

28 Claims, 5 Drawing Sheets

(56) References Cited

U.S. PATENT DOCUMENTS

| | | | | |
|---|---|---|---|---|
| 2005/0238848 | A1* | 10/2005 | Fensel | E04D 1/20 |
| | | | | 428/143 |
| 2007/0221095 | A1* | 9/2007 | Mehta | C08L 95/00 |
| | | | | 106/280 |
| 2008/0114112 | A1* | 5/2008 | Hemmings | C08K 11/00 |
| | | | | 524/425 |
| 2010/0055399 | A1 | 3/2010 | Rosko et al. | |
| 2013/0108882 | A1* | 5/2013 | Stuart | C08G 65/336 |
| | | | | 428/489 |
| 2016/0222665 | A1* | 8/2016 | Belt | B32B 5/024 |
| 2016/0297969 | A1* | 10/2016 | Naidoo | E01C 7/35 |
| 2020/0040582 | A1 | 2/2020 | Boss et al. | |

* cited by examiner

*FIG. 6*

ROOFING MATERIALS WITH INCREASED WIND UPLIFT RESISTANCE AND METHODS OF MAKING THEREOF

FIELD OF THE INVENTION

This invention relates to roofing materials with increased wind uplift resistance and methods of making such roofing materials. The roofing materials include a sealant attachment zone with surfacing media. Roofing materials, such as shingles, that include this sealant attachment zone exhibit superior properties of, for example, increased wind uplift resistance, as compared to roofing materials without such a sealant attachment zone.

BACKGROUND OF THE INVENTION

Typically, roofing materials, such as, e.g., shingles, are based upon a fiberglass or felt mat that is coated and impregnated with an asphalt-based composition that is subsequently coated with granules. Generally, these roofing materials further include a sealant that is applied at one or more locations on a backing during the time of manufacturing. During this application step, the sealant is generally in the form of a molten asphaltic sealant. When the sealant cools into a solid form after manufacturing and during installation of the roofing material, the sealant is generally placed into contact with a granulated surface of another previously installed roofing material where adhesion between the roofing materials will later be activated by solar heat. In this case, the sealant usually adheres to the granulated surface first, once the sealant is thermally activated by solar heat. The presence of granules on the previously installed roofing material's surface, however, can interfere with the sealant forming a strong cohesive bond. As a result, wind uplift resistance can be limited due to the fact that the sealant will be attaching to the granulated surface first, and the presence of granules on the previously installed roofing material's surface can interfere with the sealant from making direct surface-to-surface contact (e.g., asphalt-to-asphalt contact).

There is therefore a need for a roofing material having a sealant attachment zone that comprises surfacing media that promotes the ability of sealants, such as, e.g., asphaltic sealants, to make better contact between overlying roofing materials and previously installed roofing materials to thus form a strong bond, and thereby increase wind uplift resistance of the roofing materials.

SUMMARY OF THE INVENTION

One embodiment of this invention pertains to a roofing material comprising (a) a front surface, (b) a back surface, and (c) a sealant attachment zone disposed on at least the front surface of the roofing material, the sealant attachment zone including surfacing media that comprise at least one of mineral particles, polymeric particles, and combinations thereof. The sealant attachment zone has an average surface coverage with the surfacing media of 30% to 70%. The roofing material exhibits an increased wind uplift resistance, as measured according to ASTM D6381, as compared to a roofing material without a sealant attachment zone having said average surface coverage with the surfacing media of 30% to 70%.

In one embodiment, the sealant attachment zone has an average surface coverage with the surfacing media of 40% to 70%.

In one embodiment, the sealant attachment zone has an average surface coverage with the surfacing media of 40% to 60%.

In one embodiment, the surfacing media comprise mineral particles that include at least one of slag fines, granule fines, sands, limestone fines, calcium carbonate, slate fines, and combinations thereof.

In some embodiments, the surfacing media comprise polymeric particles that include at least one of rubber particles, linear low-density polyethylene (LLDPE) particles, styrene-butadiene-styrene (SBS) powders, particles having a polar functional group that is selected from the group consisting of an alcohol, a carboxyl, a phenolic, an amine, and a thiol, and combinations thereof.

In one embodiment, the surfacing media have a particle size distribution of 16 to 270 US mesh. In some embodiments, the surfacing media have a particle size distribution of 16 to 100 US mesh.

In one embodiment, the surfacing media have a mean particle size of 100 to 250 microns. In some embodiments, the surfacing media have a mean particle size of 200 to 250 microns.

In some embodiments, the sealant attachment zone comprises (i) a first region having a percentage of surface coverage of the surfacing media that is less than the average surface coverage, and (ii) a second region having a percentage of surface coverage of the surfacing media that is greater than the average surface coverage.

In one embodiment, the roofing material exhibits a decreased surface tack temperature (° F.) as compared to a roofing material without the sealant attachment zone.

In one embodiment, the roofing material is a roofing shingle.

In one embodiment, the surfacing media further comprise a tackifier, an encapsulated adhesion promoter, magnetic powder, and combinations thereof. In some embodiments, the surfacing media further comprise ferrous metal powder.

Another embodiment of this invention pertains to a method of preparing a roofing material. The method comprises (a) obtaining a substrate, (b) obtaining surfacing media that comprise at least one of mineral particles, polymeric particles, and combinations thereof, and (c) applying the surfacing media to a surface of the substrate to form a roofing material having a sealant attachment zone with an average surface coverage of the surfacing media of 30% to 70%. The roofing material exhibits an increased wind uplift resistance, as measured according to ASTM D6381, as compared to a roofing material without a sealant attachment zone having said average surface coverage of the surfacing media of 30% to 70%.

In one embodiment, the sealant attachment zone has an average surface coverage of the surfacing media of 40% to 70%.

In one embodiment, the sealant attachment zone has an average surface coverage of the surfacing media of 40% to 60%.

In one embodiment, the method further includes heating the surfacing media prior to applying the surfacing media to the surface of the substrate.

In one embodiment, the applying the surfacing media to the surface of the substrate is conducted by controlling an amount of the surfacing media applied to the surface of the substrate. In some embodiments, the controlling the amount of the surfacing media applied to the surface of the substrate is conducted by forming (i) a first region of the sealant attachment zone that has a percentage of surface coverage of the surfacing media that is less than the average surface coverage, and (ii) a second region of the sealant attachment zone that has a percentage of surface coverage of the surfacing media that is greater than the average surface coverage.

In one embodiment, the surfacing media comprise mineral particles that include at least one of slag fines, granule fines, sands, limestone fines, calcium carbonate, slate fines, and combinations thereof.

In some embodiments, the surfacing media comprise polymeric particles that include at least one of rubber particles, linear low-density polyethylene (LLDPE) particles, styrene-butadiene-styrene (SBS) powders, particles having a polar functional group that is selected from the group consisting of an alcohol, a carboxyl, a phenolic, an amine, and a thiol, and combinations thereof.

In one embodiment, the surfacing media have a particle size distribution of 16 to 270 US mesh. In some embodiments, the surfacing media have a particle size distribution of 16 to 100 US mesh.

In one embodiment, the surfacing media have a mean particle size of 100 to 250 microns. In some embodiments, the surfacing media have a mean particle size of 200 to 250 microns.

In one embodiment, the roofing material exhibits a decreased surface tack temperature (° F.) as compared to a roofing material without the sealant attachment zone.

In one embodiment, the roofing material is a roofing shingle.

In one embodiment, the surfacing media further comprise a tackifier, an encapsulated adhesion promoter, magnetic powder, and combinations thereof. In some embodiments, the surfacing media further comprise ferrous metal powder.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION OF THE INVENTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

One embodiment of this invention pertains to a roofing material comprising (a) a front surface, (b) a back surface, and (c) a sealant attachment zone disposed on at least the front surface of the roofing material, the sealant attachment zone including surfacing media that comprise at least one of mineral particles, polymeric particles, and combinations thereof. The sealant attachment zone has an average surface coverage of the surfacing media of 30% to 70%. The roofing material exhibits an increased wind uplift resistance, as measured according to ASTM D6381, as compared to a roofing material without a sealant attachment zone having said average surface coverage of the surfacing media of 30% to 70%.

Figure 1:
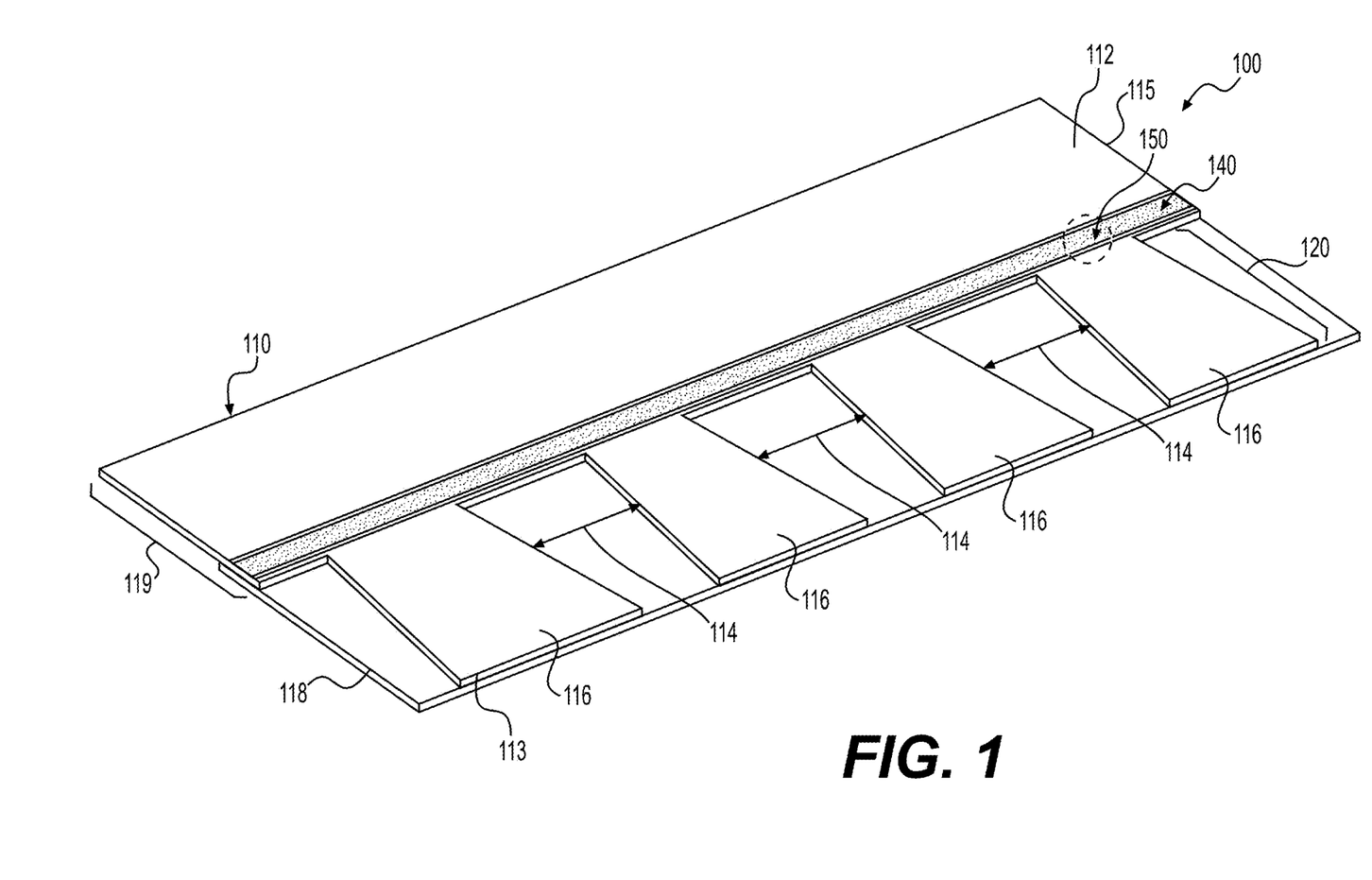
FIG. 1 is an illustration of a roofing material with a sealant attachment zone according to an embodiment of the invention.
Figure 2:
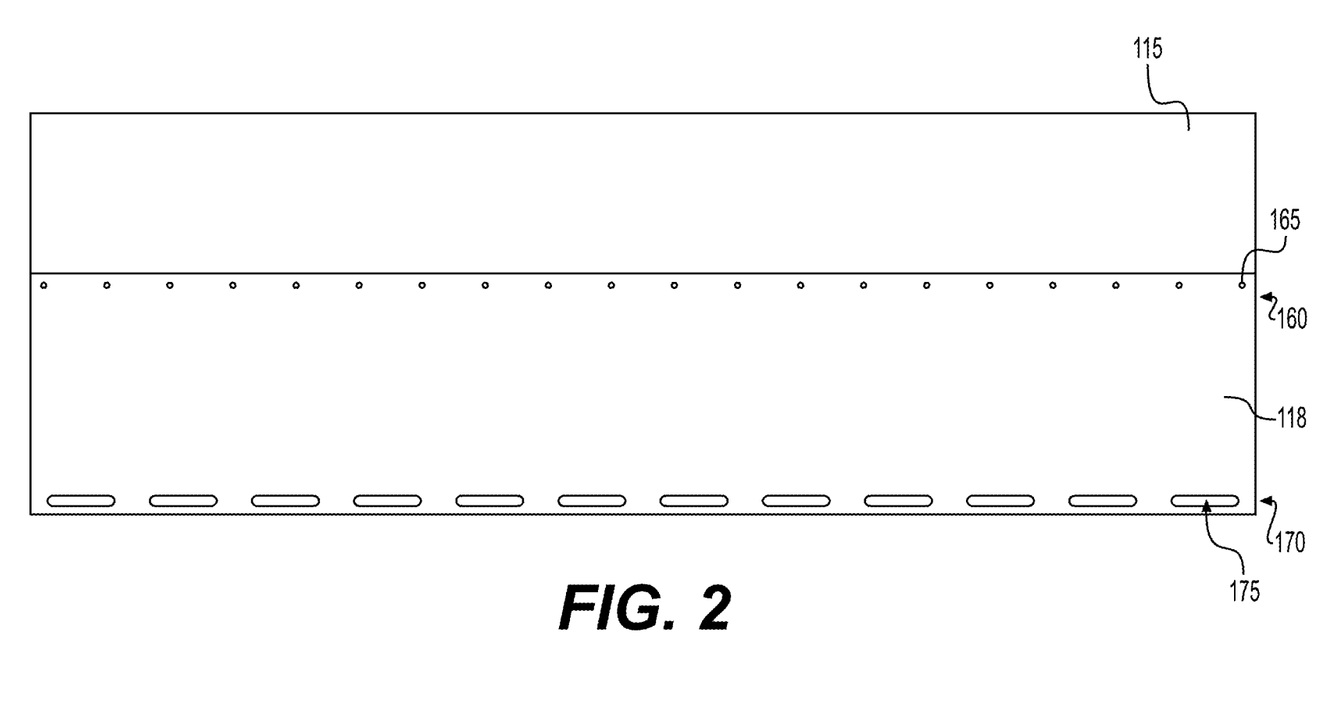
FIG. 2 is an illustration of a bottom view of the roofing material shown in FIG. 1, according to an embodiment of the invention.

FIG. 1 illustrates a roofing material (e.g., shingle) 100 according to an embodiment of the invention. In this embodiment, the roofing material 100 includes an upper layer 110 having a front surface 112 and a back surface 115. The roofing material 100 further includes an upper portion or headlap portion 119 and a lower portion or buttlap portion 120. The buttlap portion 120 includes a series of cut-outs 114 leaving a plurality of tabs 116. The edge 113 of the buttlap portion 120 will be the lowermost or bottom edge of the roofing material 100 when installed onto a roof. Attached and/or laminated to the back surface 115 of the roofing material 100 is a backer strip 118. As shown in FIG. 1, the upper surface of the backer strip 118 is visible between the tabs 116 of the buttlap portion 120 of the upper layer 110 of the roofing material 100. FIG. 2 illustrates one embodiment of the underside of the roofing material 100 of FIG. 1, in which the backer strip 118 is attached to the back surface 115 of the roofing material 100 in a region or nail zone 160 via a plurality of mechanical fasteners 165. Non-limiting examples of various types of mechanical fasteners are detailed in U.S. Pat. No. 8,006,457, as well as U.S. patent application Ser. No. 16/533,032, the contents of which are hereby incorporated reference. In an embodiment, the backer strip 118 is attached to the back surface 115 of the roofing material 100 with an adhesive (not shown) and with few to no mechanical fasteners (e.g., fasteners 165). In the embodiment of FIG. 2, a line 170 of sealant 175 is also provided along a lower edge of the backer strip 118. This line 170 of sealant 175 is configured to attach the roofing material 100 to a sealant attachment zone (e.g., sealant attachment zone 140 of FIG. 1) of a previously installed roofing material. Although the embodiment of FIG. 2 illustrates a line 170 of sealant 175 that comprises a plurality of spaced apart dots of sealant 175, the sealant 175 could also be provided as a single line of sealant, multiple lines of sealant, or combinations thereof.

The roofing material 100 of the embodiment of FIG. 1 further includes a sealant attachment zone 140 disposed on the front surface 112 of the roofing material 100, in the area in which the headlap portion 119 meets the buttlap portion 120. According to one embodiment, the sealant attachment zone 140 is disposed on the front surface 112 of the roofing material 100 in an area in which the sealant attachment zone 140 will directly contact a sealant(s) of a roofing material (e.g., shingle) that is placed immediately above the roofing material 100 of FIG. 1. The sealant attachment zone 140 further includes surfacing media 150 at a certain average surface coverage (e.g., 30% to 70%).

In an embodiment, the sealant attachment zone has an average surface coverage of the surfacing media of 30% to 75%. In an embodiment, the sealant attachment zone has an average surface coverage of the surfacing media of 30% to 70%. In an embodiment, the sealant attachment zone has an average surface coverage of the surfacing media of 30% to 65%. In an embodiment, the sealant attachment zone has an average surface coverage of the surfacing media of 30% to 60%. In an embodiment, the sealant attachment zone has an average surface coverage of the surfacing media of 30% to 55%. In an embodiment, the sealant attachment zone has an average surface coverage of the surfacing media of 30% to 50%. In an embodiment, the sealant attachment zone has an average surface coverage of the surfacing media of 30% to 45%. In an embodiment, the sealant attachment zone has an average surface coverage of the surfacing media of 30% to 40%. In an embodiment, the sealant attachment zone has an average surface coverage of the surfacing media of 30% to 35%. In an embodiment, the sealant attachment zone has an average surface coverage of the surfacing media of 35% to 75%. In an embodiment, the sealant attachment zone has an average surface coverage of the surfacing media of 35% to 70%. In an embodiment, the sealant attachment zone has an average surface coverage of the surfacing media of 35% to 65%. In an embodiment, the sealant attachment zone has an average surface coverage of the surfacing media of 35% to 60%. In an embodiment, the sealant attachment zone has an average surface coverage of the surfacing media of 35% to 55%. In an embodiment, the sealant attachment zone has an average surface coverage of the surfacing media of 35% to 50%. In an embodiment, the sealant attachment zone has an average surface coverage of the surfacing media of 35% to 45%. In an embodiment, the sealant attachment zone has an average surface coverage of the surfacing media of 35% to 40%. In an embodiment, the sealant attachment zone has an average surface coverage of the surfacing media of 40% to 75%. In an embodiment, the sealant attachment zone has an average surface coverage of the surfacing media of 40% to 70%. In an embodiment, the sealant attachment zone has an average surface coverage of the surfacing media of 40% to 65%. In an embodiment, the sealant attachment zone has an average surface coverage of the surfacing media of 40% to 60%. In an embodiment, the sealant attachment zone has an average surface coverage of the surfacing media of 40% to 55%. In an embodiment, the sealant attachment zone has an average surface coverage of the surfacing media of 40% to 50%. In an embodiment, the sealant attachment zone has an average surface coverage of the surfacing media of 40% to 45%. In an embodiment, the sealant attachment zone has an average surface coverage of the surfacing media of 45% to 75%. In an embodiment, the sealant attachment zone has an average surface coverage of the surfacing media of 45% to 70%. In an embodiment, the sealant attachment zone has an average surface coverage of the surfacing media of 45% to 65%. In an embodiment, the sealant attachment zone has an average surface coverage of the surfacing media of 45% to 60%. In an embodiment, the sealant attachment zone has an average surface coverage of the surfacing media of 45% to 55%. In an embodiment, the sealant attachment zone has an average surface coverage of the surfacing media of 45% to 50%. In an embodiment, the sealant attachment zone has an average surface coverage of the surfacing media of 50% to 75%. In an embodiment, the sealant attachment zone has an average surface coverage of the surfacing media of 50% to 70%. In an embodiment, the sealant attachment zone has an average surface coverage of the surfacing media of 50% to 65%. In an embodiment, the sealant attachment zone has an average surface coverage of the surfacing media of 50% to 60%. In an embodiment, the sealant attachment zone has an average surface coverage of the surfacing media of 50% to 55%. In an embodiment, the sealant attachment zone has an average surface coverage of the surfacing media of 55% to 75%. In an embodiment, the sealant attachment zone has an average surface coverage of the surfacing media of 55% to 70%. In an embodiment, the sealant attachment zone has an average surface coverage of the surfacing media of 55% to 65%. In an embodiment, the sealant attachment zone has an average surface coverage of the surfacing media of 55% to 60%. In an embodiment, the sealant attachment zone has an average surface coverage of the surfacing media of 60% to 75%. In an embodiment, the sealant attachment zone has an average surface coverage of the surfacing media of 60% to 70%. In an embodiment, the sealant attachment zone has an average surface coverage of the surfacing media of 60% to 65%. In an embodiment, the sealant attachment zone has an average surface coverage of the surfacing media of 65% to 75%. In an embodiment, the sealant attachment zone has an average surface coverage of the surfacing media of 65% to 70%. In an embodiment, the sealant attachment zone has an average surface coverage of the surfacing media of 70% to 75%.

In an embodiment, the surfacing media comprise mineral particles that include at least one of slag fines, granule fines, sands, limestone fines, calcium carbonate, slate fines, and combinations thereof. In some embodiments, the surfacing media comprise various minerals and/or materials extracted from a quarry, including, for example, various types of granite, basalt, clay, coal, gypsum, limestone, marble, quartz, rhyolite, sandstone, quartz, among others, as well as combinations thereof.

In some embodiments, the surfacing media comprise polymeric particles that include at least one of rubber particles, linear low-density polyethylene (LLDPE) particles, styrene-butadiene-styrene (SBS) powders, particles having a polar functional group that is selected from the group consisting of an alcohol, a carboxyl, a phenolic, an amine, and a thiol, and combinations thereof. In some embodiments, the surfacing media comprise activated rubber particles from reclaimed tire. In some embodiments, the surfacing media comprise recycled asphalt, such as, e.g., recycled asphaltic shingles. According to one embodiment, the surfacing media have a high affinity for a sealant, including, e.g., an asphaltic sealant.

In an embodiment, the surfacing media comprise glass.

In an embodiment, the surfacing media comprise nickel, copper, iron, titanium, and/or zinc, as well as any other metal, and combinations thereof.

In an embodiment, the surfacing media further includes granules. In some embodiments, the surfacing media is free of granules.

In an embodiment, the surfacing media have a particle size distribution of 16 to 270 US mesh. In an embodiment, the surfacing media have a particle size distribution of 16 to 250 US mesh. In an embodiment, the surfacing media have a particle size distribution of 16 to 225 US mesh. In an embodiment, the surfacing media have a particle size distribution of 16 to 200 US mesh. In an embodiment, the surfacing media have a particle size distribution of 16 to 175 US mesh. In an embodiment, the surfacing media have a particle size distribution of 16 to 150 US mesh. In an embodiment, the surfacing media have a particle size distribution of 16 to 125 US mesh. In an embodiment, the surfacing media have a particle size distribution of 16 to 100 US mesh. In an embodiment, the surfacing media have a particle size distribution of 16 to 75 US mesh. In an embodiment, the surfacing media have a particle size distribution of 16 to 50 US mesh. In an embodiment, the surfacing media have a particle size distribution of 16 to 40 US mesh. In an embodiment, the surfacing media have a particle size distribution of 16 to 30 US mesh. In an embodiment, the surfacing media have a particle size distribution of 16 to 25 US mesh. In an embodiment, the surfacing media have a particle size distribution of 16 to 20 US mesh. In an embodiment, the surfacing media have a particle size distribution of 20 to 270 US mesh. In an embodiment, the surfacing media have a particle size distribution of 20 to 250 US mesh. In an embodiment, the surfacing media have a particle size distribution of 20 to 225 US mesh. In an embodiment, the surfacing media have a particle size distribution of 20 to 200 US mesh. In an embodiment, the surfacing media have a particle size distribution of 20 to 175 US mesh. In an embodiment, the surfacing media have a particle size distribution of 20 to 150 US mesh. In an embodiment, the surfacing media have a particle size distribution of 20 to 125 US mesh. In an embodiment, the surfacing media have a particle size distribution of 20 to 100 US mesh. In an embodiment, the surfacing media have a particle size distribution of 20 to 75 US mesh. In an embodiment, the surfacing media have a particle size distribution of 20 to 50 US mesh. In an embodiment, the surfacing media have a particle size distribution of 20 to 40 US mesh. In an embodiment, the surfacing media have a particle size distribution of 20 to 30 US mesh. In an embodiment, the surfacing media have a particle size distribution of 20 to 25 US mesh. In an embodiment, the surfacing media have a particle size distribution of 25 to 270 US mesh. In an embodiment, the surfacing media have a particle size distribution of 25 to 250 US mesh. In an embodiment, the surfacing media have a particle size distribution of 25 to 225 US mesh. In an embodiment, the surfacing media have a particle size distribution of 25 to 200 US mesh. In an embodiment, the surfacing media have a particle size distribution of 25 to 175 US mesh. In an embodiment, the surfacing media have a particle size distribution of 25 to 150 US mesh. In an embodiment, the surfacing media have a particle size distribution of 25 to 125 US mesh. In an embodiment, the surfacing media have a particle size distribution of 25 to 100 US mesh. In an embodiment, the surfacing media have a particle size distribution of 25 to 75 US mesh. In an embodiment, the surfacing media have a particle size distribution of 25 to 50 US mesh. In an embodiment, the surfacing media have a particle size distribution of 25 to 40 US mesh. In an embodiment, the surfacing media have a particle size distribution of 25 to 30 US mesh. In an embodiment, the surfacing media have a particle size distribution of 30 to 270 US mesh. In an embodiment, the surfacing media have a particle size distribution of 30 to 250 US mesh. In an embodiment, the surfacing media have a particle size distribution of 30 to 225 US mesh. In an embodiment, the surfacing media have a particle size distribution of 30 to 200 US mesh. In an embodiment, the surfacing media have a particle size distribution of 30 to 175 US mesh. In an embodiment, the surfacing media have a particle size distribution of 30 to 150 US mesh. In an embodiment, the surfacing media have a particle size distribution of 30 to 125 US mesh. In an embodiment, the surfacing media have a particle size distribution of 30 to 100 US mesh. In an embodiment, the surfacing media have a particle size distribution of 30 to 75 US mesh. In an embodiment, the surfacing media have a particle size distribution of 30 to 50 US mesh. In an embodiment, the surfacing media have a particle size distribution of 30 to 40 US mesh. In an embodiment, the surfacing media have a particle size distribution of 40 to 270 US mesh. In an embodiment, the surfacing media have a particle size distribution of 40 to 250 US mesh. In an embodiment, the surfacing media have a particle size distribution of 40 to 225 US mesh. In an embodiment, the surfacing media have a particle size distribution of 40 to 200 US mesh. In an embodiment, the surfacing media have a particle size distribution of 40 to 175 US mesh. In an embodiment, the surfacing media have a particle size distribution of 40 to 150 US mesh. In an embodiment, the surfacing media have a particle size distribution of 40 to 125 US mesh. In an embodiment, the surfacing media have a particle size distribution of 40 to 100 US mesh. In an embodiment, the surfacing media have a particle size distribution of 40 to 75 US mesh. In an embodiment, the surfacing media have a particle size distribution of 40 to 50 US mesh. In an embodiment, the surfacing media have a particle size distribution of 50 to 270 US mesh. In an embodiment, the surfacing media have a particle size distribution of 50 to 250 US mesh. In an embodiment, the surfacing media have a particle size distribution of 50 to 225 US mesh. In an embodiment, the surfacing media have a particle size distribution of 50 to 200 US mesh. In an embodiment, the surfacing media have a particle size distribution of 50 to 175 US mesh. In an embodiment, the surfacing media have a particle size distribution of 50 to 150 US mesh. In an embodiment, the surfacing media have a particle size distribution of 50 to 125 US mesh. In an embodiment, the surfacing media have a particle size distribution of 50 to 100 US mesh. In an embodiment, the surfacing media have a particle size distribution of 50 to 75 US mesh. In an embodiment, the surfacing media have a particle size distribution of 75 to 270 US mesh. In an embodiment, the surfacing media have a particle size distribution of 75 to 250 US mesh. In an embodiment, the surfacing media have a particle size distribution of 75 to 225 US mesh. In an embodiment, the surfacing media have a particle size distribution of 75 to 200 US mesh. In an embodiment, the surfacing media have a particle size distribution of 75 to 175 US mesh. In an embodiment, the surfacing media have a particle size distribution of 75 to 150 US mesh. In an embodiment, the surfacing media have a particle size distribution of 75 to 125 US mesh. In an embodiment, the surfacing media have a particle size distribution of 75 to 100 US mesh. In an embodiment, the surfacing media have a particle size distribution of 100 to 270 US mesh. In an embodiment, the surfacing media have a particle size distribution of 100 to 250 US mesh. In an embodiment, the surfacing media have a particle size distribution of 100 to 225 US mesh. In an embodiment, the surfacing media have a particle size distribution of 100 to 200 US mesh. In an embodiment, the surfacing media have a particle size distribution of 100 to 175 US mesh. In an embodiment, the surfacing media have a particle size distribution of 100 to 150 US mesh. In an embodiment, the surfacing media have a particle size distribution of 100 to 125 US mesh. In an embodiment, the surfacing media have a particle size distribution of 125 to 270 US mesh. In an embodiment, the surfacing media have a particle size distribution of 125 to 250 US mesh. In an embodiment, the surfacing media have a particle size distribution of 125 to 225 US mesh. In an embodiment, the surfacing media have a particle size distribution of 125 to 200 US mesh. In an embodiment, the surfacing media have a particle size distribution of 125 to 175 US mesh. In an embodiment, the surfacing media have a particle size distribution of 125 to 150 US mesh. In an embodiment, the surfacing media have a particle size distribution of 150 to 270 US mesh. In an embodiment, the surfacing media have a particle size distribution of 150 to 250 US mesh. In an embodiment, the surfacing media have a particle size distribution of 150 to 225 US mesh. In an embodiment, the surfacing media have a particle size distribution of 150 to 200 US mesh. In an embodiment, the surfacing media have a particle size distribution of 150 to 175 US mesh. In an embodiment, the surfacing media have a particle size distribution of 175 to 270 US mesh. In an embodiment, the surfacing media have a particle size distribution of 175 to 250 US mesh. In an embodiment, the surfacing media have a particle size distribution of 175 to 225 US mesh. In an embodiment, the surfacing media have a particle size distribution of 175 to 200 US mesh. In an embodiment, the surfacing media have a particle size distribution of 200 to 270 US mesh. In an embodiment, the surfacing media have a particle size distribution of 200 to 250 US mesh. In an embodiment, the surfacing media have a particle size distribution of 200 to 225 US mesh. In an embodiment, the surfacing media have a particle size distribution of 225 to 270 US mesh. In an embodiment, the surfacing media have a particle size distribution of 225 to 250 US mesh. In an embodiment, the surfacing media have a particle size distribution of 250 to 270 US mesh.

In an embodiment, the surfacing media have a mean particle size of 100 to 250 microns. In an embodiment, the surfacing media have a mean particle size of 100 to 225 microns. In an embodiment, the surfacing media have a mean particle size of 100 to 200 microns. In an embodiment, the surfacing media have a mean particle size of 100 to 175 microns. In an embodiment, the surfacing media have a mean particle size of 100 to 150 microns. In an embodiment, the surfacing media have a mean particle size of 100 to 125 microns. In an embodiment, the surfacing media have a mean particle size of 125 to 250 microns. In an embodiment, the surfacing media have a mean particle size of 125 to 225 microns. In an embodiment, the surfacing media have a mean particle size of 125 to 200 microns. In an embodiment, the surfacing media have a mean particle size of 125 to 175 microns. In an embodiment, the surfacing media have a mean particle size of 125 to 150 microns. In an embodiment, the surfacing media have a mean particle size of 150 to 250 microns. In an embodiment, the surfacing media have a mean particle size of 150 to 225 microns. In an embodiment, the surfacing media have a mean particle size of 150 to 200 microns. In an embodiment, the surfacing media have a mean particle size of 150 to 175 microns. In an embodiment, the surfacing media have a mean particle size of 175 to 250 microns. In an embodiment, the surfacing media have a mean particle size of 175 to 225 microns. In an embodiment, the surfacing media have a mean particle size of 175 to 200 microns. In an embodiment, the surfacing media have a mean particle size of 200 to 250 microns. In an embodiment, the surfacing media have a mean particle size of 200 to 225 microns. In an embodiment, the surfacing media have a mean particle size of 225 to 250 microns.

Figure 3:
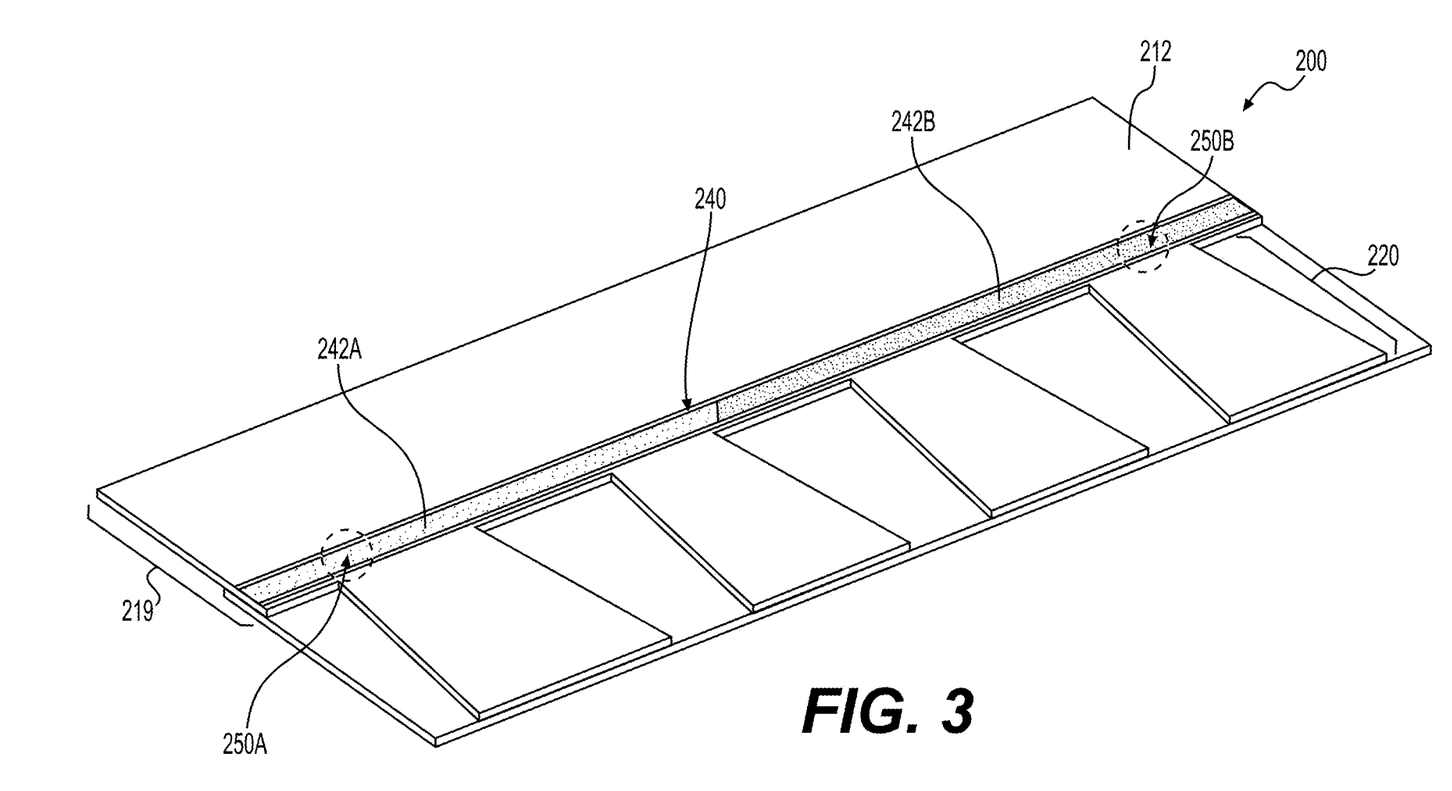
FIG. 3 is an illustration of a roofing material with a sealant attachment zone according to another embodiment of the invention.

In an embodiment, the sealant attachment zone comprises (i) a first region having a percentage of surface coverage of the surfacing media that is less than the average surface coverage, and (ii) a second region having a percentage of surface coverage of the surfacing media that is greater than the average surface coverage. FIG. 3 illustrates an exemplary roofing material (e.g., shingle) 200 according to this embodiment of the invention. In this embodiment, the roofing material 200 includes many of the same features, as discussed above, with respect to the embodiment of the roofing material 100 of FIG. 1. The roofing material 200 of the embodiment of FIG. 3 further includes a sealant attachment zone 240 disposed on the front surface 212 of the roofing material 200, in the area in which the headlap portion 219 meets the buttlap portion 220. The sealant attachment zone 240 includes (i) a first region 242A having surfacing media 250A at a percentage of surface coverage that is less than the average surface coverage (e.g., an average surface coverage of 30% to 70%), and (ii) a second region 242B having surfacing media 250B at a percentage of surface coverage that is greater than the average surface coverage (e.g., an average surface coverage of 30% to 70%).

In some embodiments, the sealant attachment zone has an average surface coverage of the surfacing media of 30% to 70%, with (i) a first region having a surface coverage of the surfacing media of 10% to 25% and (ii) a second region having a surface coverage of the surfacing media of 75% to 100%. In some embodiments, the sealant attachment zone has an average surface coverage of the surfacing media of 30% to 70%, with (i) a first region having a surface coverage of the surfacing media of 15% to 25% and (ii) a second region having a surface coverage of the surfacing media of 75% to 100%. In some embodiments, the sealant attachment zone has an average surface coverage of the surfacing media of 30% to 70%, with (i) a first region having a surface coverage of the surfacing media of 20% to 25% and (ii) a second region having a surface coverage of the surfacing media of 75% to 100%. In some embodiments, the sealant attachment zone has an average surface coverage of the surfacing media of 30% to 70%, with (i) a first region having a surface coverage of the surfacing media of 10% to 25% and (ii) a second region having a surface coverage of the surfacing media of 80% to 100%. In some embodiments, the sealant attachment zone has an average surface coverage of the surfacing media of 30% to 70%, with (i) a first region having a surface coverage of the surfacing media of 10% to 25% and (ii) a second region having a surface coverage of the surfacing media of 85% to 100%. In some embodiments, the sealant attachment zone has an average surface coverage of the surfacing media of 30% to 70%, with (i) a first region having a surface coverage of the surfacing media of 10% to 25% and (ii) a second region having a surface coverage of the surfacing media of 90% to 100%. In some embodiments, the sealant attachment zone has an average surface coverage of the surfacing media of 30% to 70%, with (i) a first region having a surface coverage of the surfacing media of 10% to 25% and (ii) a second region having a surface coverage of the surfacing media of 95% to 100%.

In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 70% to 100%. In some embodiments, the sealant attachment zone has an average surface coverage of the surfacing media of 40% to 60%, with (i) a first region having a surface coverage of the surfacing media of 15% to 30% and (ii) a second region having a surface coverage of the surfacing media of 70% to 100%. In some embodiments, the sealant attachment zone has an average surface coverage of the surfacing media of 40% to 60%, with (i) a first region having a surface coverage of the surfacing media of 20% to 30% and (ii) a second region having a surface coverage of the surfacing media of 70% to 100%. In some embodiments, the sealant attachment zone has an average surface coverage of the surfacing media of 40% to 60%, with (i) a first region having a surface coverage of the surfacing media of 25% to 30% and (ii) a second region having a surface coverage of the surfacing media of 70% to 100%. In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 75% to 100%. In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 80% to 100%. In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 85% to 100%. In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 90% to 100%. In some embodiments, the sealant attachment zone has an average surface coverage of the surfacing media of 40% to 60%, with (i) a first region having a surface coverage of the surfacing media of 10% to 30% and (ii) a second region having a surface coverage of the surfacing media of 95% to 100%.

In an embodiment, the roofing material exhibits a decreased surface tack temperature (° F.) as compared to a roofing material without the sealant attachment zone. According to this embodiment, the sealant attachment zone and/or surfacing media promote low temperature adhesion, which can thus enhance bonding and/or low temperature wind resistance when the roofing materials are installed at cold temperatures.

In an embodiment, the roofing material is a roofing shingle. According to one embodiment, the roofing shingle is one of (i) a single layer shingle or (ii) a laminated shingle having two or more layers.

Other ingredients and/or additives may also be added to the surfacing media to further modify their properties. In an embodiment, the surfacing media further comprise a tackifier, an encapsulated adhesion promoter, magnetic powder, and combinations thereof. In an embodiment, the encapsulated adhesion promoter can increase the chemical affinity to a sealant material upon contact and/or provide time release benefits over a prolonged period of time to enhance sealant strength, as the roofing material (e.g., shingle) is exposed to an outdoor environment. In some embodiments, the surfacing media further comprise ferrous metal powder. According to one embodiment, magnetic powder is applied to one surface (e.g., the back surface or underside) of the roofing material, while ferrous metal powder (or another material that attracts to the magnetic powder) is applied to the opposite surface (e.g., the front surface or top side) of the roofing material, to thereby attract to magnetic powder that is applied to an overlying roofing material and thus improve the bonding between the overlying and the previously installed roofing materials.

Another embodiment of this invention pertains to a method of preparing a roofing material. The method comprises (a) obtaining a substrate, (b) obtaining surfacing media that comprise at least one of mineral particles, polymeric particles, and combinations thereof, and (c) applying the surfacing media to a surface of the substrate to form a roofing material having a sealant attachment zone with an average surface coverage of the surfacing media of 30% to 70%. The roofing material exhibits an increased wind uplift resistance, as measured according to ASTM D6381, as compared to a roofing material without a sealant attachment zone having said average surface coverage of the surfacing media of 30% to 70%.

In an embodiment, the substrate comprises one of a fiberglass mat or a polyester mat. In an embodiment, the substrate comprises one of a fiberglass mat, a polyester mat, a scrim, a coated scrim, or a combination thereof. In an embodiment, the substrate comprises a fiberglass mat, a polyester mat, a scrim, a coated scrim, and/or other synthetic or natural scrims. In some embodiments, the substrate or mat includes nano-fibrillated cellulose fibers.

In an embodiment, the method further comprises heating the surfacing media prior to applying the surfacing media to the surface of the substrate. According to one embodiment, such heating of the surfacing media prior to applying the surfacing media to the surface of the substrate can increase adhesion of the surfacing media to the substrate, which thereby promotes or improves the wind uplift resistance.

Figure 4:
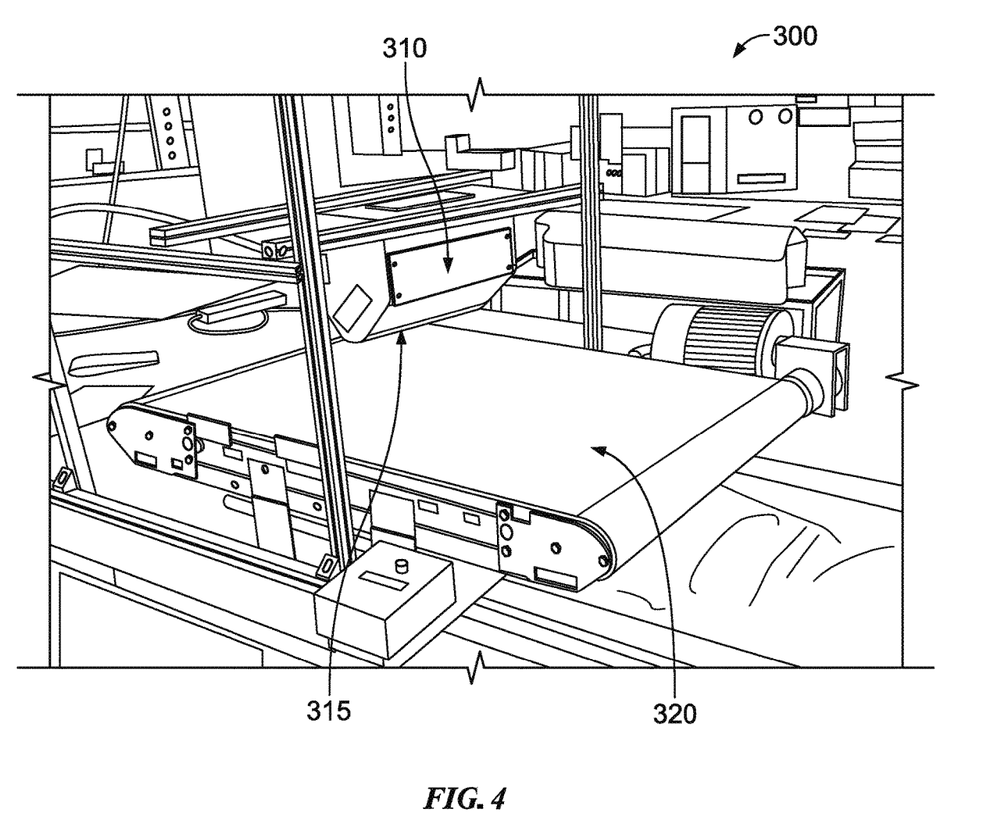
FIG. 4 is a photograph of a moving conveyor for use when preparing a prototype roofing material according to embodiments of the invention.

In an embodiment, the applying the surfacing media to the surface of the substrate is conducted by controlling an amount of the surfacing media applied to the surface of the substrate. FIG. 4 illustrates an exemplary apparatus 300 for controlling an amount of the surfacing media to be applied to the surface of the substrate according to embodiments of the invention. As shown in FIG. 4, the apparatus 300 includes a feed silo 310, such as, e.g., a vibratory feed silo, in which surfacing media (not shown) is provided and released via a set opening 315 onto the surface of a substrate (e.g., a molten asphalt coated fiberglass mat) (not shown) that is moving via a moving conveyor 320. According to this embodiment, by depositing the surfacing media using the feed silo 310 with the set opening 315, the amount of surfacing media applied to the surface of the substrate is controlled to a desirable percentage of surface coverage. In some embodiments, the controlling of the amount of the surfacing media applied to the surface of the substrate is conducted by forming (i) a first region of the sealant attachment zone that has a percentage of surface coverage of the surfacing media that is less than the average surface coverage, and (ii) a second region of the sealant attachment zone that has a percentage of surface coverage of the surfacing media that is greater than the average surface coverage (see, e.g., FIG. 3, which is discussed above).

Figure 5:
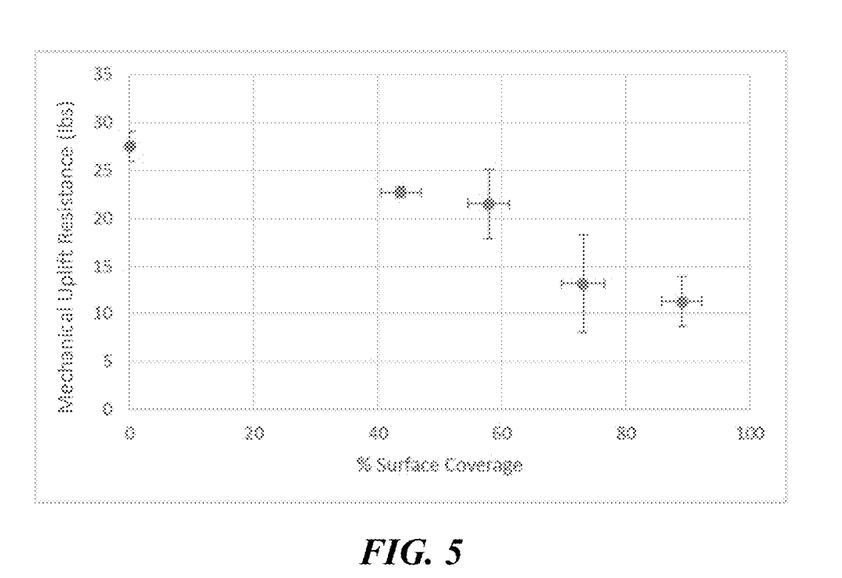
FIG. 5 is a graph illustrating the percentage of surface coverage of the surfacing media of the roofing material (x-axis) versus the mechanical wind uplift resistance (lbs) of the respective roofing material (y-axis), as measured according to ASTM D6381, according to embodiments of the invention.

Embodiments of the invention provide roofing materials with a sealant attachment zone that exhibit increased wind uplift resistance, as measured according to ASTM D6381 (see, e.g., FIG. 5). The roofing materials with the sealant attachment zone exhibit increased wind uplift resistance when the sealant of an overlying roofing material is attached and cured, to thereby form a stronger bond with the previously installed roofing material. This increased wind uplift resistance can also help the roofing material have resistance to any shear force during installation, such as, e.g., when roofers are walking on the surface of the roofing material on a sloped roof. Additionally, according to embodiments of the invention, the roofing materials with the sealant attachment zone can resist snow loading or other in-plane shear loading that would otherwise be loaded onto the substrate or fabric of the roofing material around, for example, the nail heads. Accordingly, this will help to reduce any substrate or fabric tearing around the nail head.

EXAMPLES

Specific embodiments of the invention will now be demonstrated by reference to the following examples. It should be understood that these examples are disclosed by way of illustrating the invention and should not be taken in any way to limit the scope of the present invention.

Example 1

A commercially available laminate shingle (Timberline HD, available from GAF, Tuscaloosa, AL) was produced having an upper surface covered with roofing granules (#11 grade available from SGI, Hagerstown, MD) and a sealant material (available from Craftco Co., Chandler, AZ), which was applied to a sand backing during manufacturing. When the produced shingle was tested for wind uplift resistance, following the ASTM D6381 test method, the shingle averaged a wind uplift resistance of 19.61 lbs. The roofing granules had a mean particle size of 1190 microns, with a particle size distribution of between US mesh #12 to US mesh #40. The resulting shingle had a surface coverage of about 84% to 89%, which was determined by using an image analysis method using a Keyence VHX-5000 microscope and a height level threshold method.

The same type of shingle was made, as discussed above, but with the introduction of a sealant attachment zone having coal slag fines (available from MineralTech LLC, Highlands, TX) as the surfacing media to replace the roofing granules. The resulting inventive shingle was found to have an average wind uplift resistance of 37.74 lbs, according to ASTM D6381. Thus, this prepared shingle with a sealant attachment zone exhibited a 92% increase in the wind uplift resistance as compared to that of the previously prepared shingle having no sealant attachment zone. The analysis showed that the coal slag fines had a particle size distribution of between US mesh #30 to US mesh #270, with a mean particle size of 210 microns, and a mean surface coverage of 67%, as determined by an image analysis method using a Keyence VHX-5000 microscope and a height level threshold method.

Example 2

The effect of surfacing media on wind uplift performance and related process flexibility was studied by varying the percentage or amount of surface coverage of the surfacing media over a shingle surface, such that the desirable range for both wind uplift performance and shingle processability could be determined. This was done by depositing surfacing media over a molten asphalt coating reinforced by a fiberglass mat on a moving conveyor (see, e.g., FIG. 4), which is similar to the process of shingle making. The surfacing media were deposited via a vibratory feed silo with a set opening to control the amount of surfacing media applied to the fiberglass mat and to derive the desirable surface coverage. The surfacing media had a particle size distribution of between US mesh #16 to US mesh #100, with a mean particle size of 210 microns.

The effect of the surfacing media on wind uplift performance was determined by measuring the mechanical uplift resistance using the ASTM D6381 test method. For shingle process flexibility, the effect of surface tackiness was determined by measuring the tack temperature (° F.) using a tackimeter (Model D.D.W. from E.J. Cady & Co.). This tack temperature (° F.) provides an assessment of the amount of surfacing media that is needed in order to avoid the shingle fabric from sticking to the rolls during shingle manufacturing, particularly during hot summer days when it is difficult to cool off the web.

Table 1 provides the results of the shingles with the sealant attachment zone having varying amounts of surface coverage and their resulting mechanical uplift strength. The data also include the case of a shingle with no surfacing media (i.e., 0% surface coverage of the surfacing media), or a bare asphalt coating, as a comparative or control case.

TABLE 1

| Sample Number | % Surface Coverage of the Surfacing Media | Mechanical Uplift Force (lbs) |
|---|---|---|
| 1 | 94.1 | 2.69 |
| 2 | 86.6 | 7.88 |
| 3 | 84.7 | 7.98 |
| 4 | 94.1 | 11.95 |
| 5 | 94.1 | 14.02 |
| 6 | 93.4 | 16.77 |
| 7 | 93.4 | 16.39 |
| 8 | 82 | 11.94 |
| 9 | 81.8 | 11.77 |
| 10 | 86.6 | 11.41 |
| 11 | 77 | 25.14 |
| 12 | 76 | 11.39 |
| 13 | 75.2 | 11.2 |
| 14 | 75.1 | 14.28 |
| 15 | 76 | 4.7 |
| 16 | 67.6 | 6.97 |
| 17 | 65 | 18.22 |
| 18 | 64 | 10.68 |
| 19 | 64 | 24.63 |
| 20 | 60 | 21.54 |
| 21 | 59 | 18.02 |
| 22 | 57 | 21.41 |
| 23 | 55 | 27.34 |
| 24 | 55 | 25.05 |
| 25 | 50 | 23.62 |
| 26 | 47 | 22.64 |
| 27 | 46 | 22.29 |

TABLE 1-continued

| Sample Number | % Surface Coverage of the Surfacing Media | Mechanical Uplift Force (lbs) |
|---|---|---|
| 28 | 42 | 22.45 |
| 29 | 40 | 23.57 |
| 30 | 0 | 28.26 |
| 31 | 0 | 26.08 |
| 32 | 0 | 30.33 |
| 33 | 0 | 27.03 |
| 34 | 0 | 26.07 |

Figure 6:
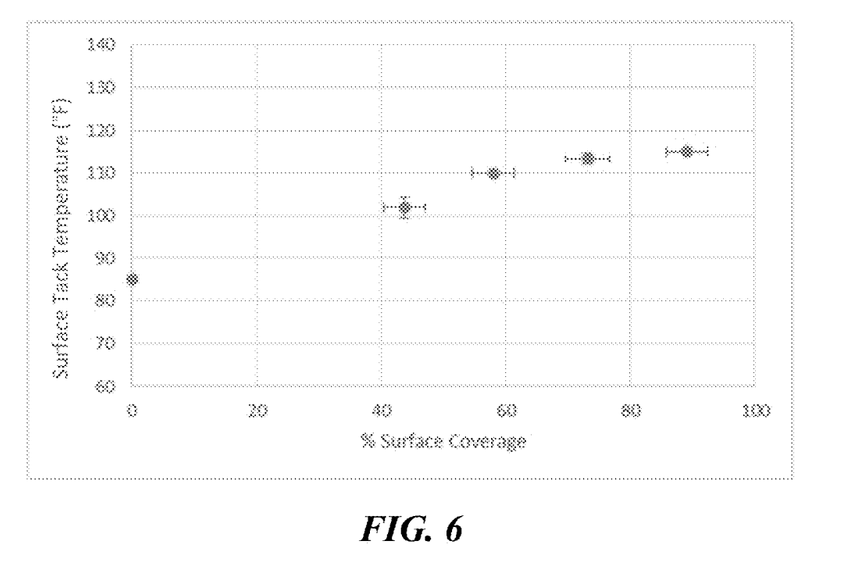
FIG. 6 is a graph illustrating the percentage of surface coverage of the surfacing media of the roofing material (x-axis) versus the surface tack temperature (° F.) of the respective roofing material (y-axis), according to embodiments of the invention.

As shown in Table 1 above, the data illustrates a non-linear trend. This is further shown in FIG. 5, in which the data is plotted by grouping the surface coverage amounts in the following categories: high coverage (>80%), medium-high coverage (65~80%), medium-low coverage (50~65%), and low coverage (<50%). As shown in Table 1 above and FIG. 5, the mechanical uplift resistance (or strength) showed (i) continuing increases in value when the surface coverage amount was from about 75% to about 30%, and (ii) a large decrease in value when the surface coverage amount was greater than about 75%. At the same time, the data on surface tackiness, which is illustrated in FIG. 6, clearly demonstrates that the tack temperature behaves non-linearly as the percentage of surface coverage decreased, indicating that a web with a low surface coverage amount of surfacing media may easily stick to the process roll and thus cause significant issues for manufacturability.

This example clearly demonstrated that there is an optimal range for the amount of surfacing media such that a desirable surface coverage can be obtained for enhancing the wind uplift performance, while maintaining good manufacturability of the asphalt coated web. In this case study, the desirable surface coverage range was found to be between about 30% and 70%, with improved results between about 40% and 60%.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:

1. A roofing material comprising:
a front surface;
a back surface;
a sealant attachment zone disposed on at least the front surface of the roofing material,
wherein the sealant attachment zone is visually defined by a first line and a second line,
wherein the sealant attachment zone comprises surfacing media disposed between the first line and the second line,
wherein the surfacing media comprise mineral particles, polymeric particles, or any combination thereof,
wherein the surfacing media are disposed on at least the front surface of the roofing material,
wherein the sealant attachment zone has an average surface coverage of the surfacing media of 40% to 60%, and
wherein the surfacing media are exposed on the front surface of the roofing material.

2. The roofing material according to claim 1, wherein the sealant attachment zone has an average surface coverage of the surfacing media of 40% to 55%.

3. The roofing material according to claim 1, wherein the sealant attachment zone has an average surface coverage of the surfacing media of 45% to 60%.

4. The roofing material according to claim 1, wherein the surfacing media comprise mineral particles that include at least one of slag fines, granule fines, sands, limestone fines, calcium carbonate, slate fines, and combinations thereof.

5. The roofing material according to claim 1, wherein the surfacing media comprise polymeric particles that include at least one of rubber particles, linear low-density polyethylene (LLDPE) particles, styrene-butadiene-styrene (SBS) powders, and combinations thereof.

6. The roofing material according to claim 1, wherein the surfacing media have a particle size distribution of 16 to 270 US mesh.

7. The roofing material according to claim 6, wherein the surfacing media have a particle size distribution of 16 to 100 US mesh.

8. The roofing material according to claim 1, wherein the surfacing media have a mean particle size of 100 to 250 microns.

9. The roofing material according to claim 1, wherein the sealant attachment zone comprises (i) a first region having a percentage of surface coverage of the surfacing media that is less than the average surface coverage, and (ii) a second region having a percentage of surface coverage of the surfacing media that is greater than the average surface coverage.

10. The roofing material according to claim 1, wherein the polymeric particles comprise particles having a polar functional group that is selected from the group consisting of an alcohol, a carboxyl, a phenolic, an amine, a thiol, and combinations thereof.

11. The roofing material according to claim 1, wherein the surfacing media further comprise a tackifier, an encapsulated adhesion promoter, magnetic powder, and combinations thereof.

12. The roofing material according to claim 1, wherein the surfacing media further comprise ferrous metal powder.

13. The roofing material according to claim 1, wherein the roofing material is a roofing shingle.

14. The roofing material according to claim 1, wherein the surfacing media directly contact a sealant of an overlying roofing material when the roofing material is installed on a surface.

15. A method of preparing a roofing material, the method comprising:
obtaining a substrate;
obtaining surfacing media that comprise mineral particles, polymeric particles, or any combination thereof; and
applying the surfacing media to a surface of the substrate to form a roofing material having a sealant attachment zone with an average surface coverage of the surfacing media of 40% to 60%,
wherein the sealant attachment zone is visually defined by a first line and a second line,
wherein the surfacing media are disposed on the roofing material in the sealant attachment zone between the first line and the second line, and
wherein the surfacing media are exposed on the surface of the roofing material.

16. The method according to claim 15, wherein the sealant attachment zone has an average surface coverage of the surfacing media of 40% to 55%.

17. The method according to claim 15, wherein the sealant attachment zone has an average surface coverage of the surfacing media of 45% to 60%.

18. The method according to claim 15, further comprising heating the surfacing media prior to applying the surfacing media to the surface of the substrate.

19. The method according to claim 15, wherein the applying the surfacing media to the surface of the substrate is conducted by controlling an amount of the surfacing media applied to the surface of the substrate.

20. The method according to claim 19, wherein the controlling the amount of the surfacing media applied to the surface of the substrate is conducted by forming (i) a first region of the sealant attachment zone that has a percentage of surface coverage of the surfacing media that is less than the average surface coverage, and (ii) a second region of the sealant attachment zone that has a percentage of surface coverage of the surfacing media that is greater than the average surface coverage.

21. The method according to claim 15, wherein the surfacing media comprise mineral particles that include at least one of slag fines, granule fines, sands, limestone fines, calcium carbonate, slate fines, and combinations thereof.

22. The method according to claim 15, wherein the surfacing media comprise polymeric particles that include at least one of rubber particles, linear low-density polyethylene (LLDPE) particles, styrene-butadiene-styrene (SBS) powders, and combinations thereof.

23. The method according to claim 15, wherein the surfacing media have a particle size distribution of 16 to 270 US mesh.

24. The method according to claim 23, wherein the surfacing media have a particle size distribution of 16 to 100 US mesh.

25. The method according to claim 15, wherein the surfacing media have a mean particle size of 100 to 250 microns.

26. The method according to claim 15, wherein the polymeric particles comprise particles having a polar functional group that is selected from the group consisting of an alcohol, a carboxyl, a phenolic, an amine, a thiol, and combinations thereof.

27. The method according to claim 15, wherein the surfacing media further comprise a tackifier, an encapsulated adhesion promoter, magnetic powder, ferrous metal powder, and combinations thereof.

28. A roofing material comprising:
a front surface;
a back surface; and
a sealant attachment zone disposed on at least the front surface of the roofing material,
wherein the sealant attachment zone is visually defined by a first line and a second line,
wherein the sealant attachment zone comprises surfacing media disposed between the first line and the second line,
wherein the surfacing media comprise mineral particles,
wherein the surfacing media having a particle size distribution of 16 to 270 US mesh,
wherein the sealant attachment zone has an average surface coverage of the surfacing media of 40% to 60%, and
wherein the surfacing media are exposed on the front surface of the roofing material.

* * * * *